(12) United States Patent
Kim

(10) Patent No.: US 7,876,783 B2
(45) Date of Patent: *Jan. 25, 2011

(54) METHOD FOR TRANSMITTING AND RECEIVING A MESSAGE USING A MOBILE COMMUNICATION TERMINAL

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1035 days.

This patent is subject to a terminal disclaimer.

(21) Appl. No.: 11/313,702

(22) Filed: Dec. 22, 2005

(65) Prior Publication Data

US 2006/0146880 A1   Jul. 6, 2006

(30) Foreign Application Priority Data

Dec. 23, 2004   (KR) .................... 10-2004-0111451

(51) Int. Cl.
H04J 3/24   (2006.01)

(52) U.S. Cl. .................... 370/473; 370/389; 455/414.4; 455/466

(58) Field of Classification Search .................. 370/316, 370/349, 473, 389; 455/412.1, 466, 414.4; 709/217, 228, 206; 348/211.2
See application file for complete search history.

(56) References Cited

U.S. PATENT DOCUMENTS

| 7,050,408 | B2 |   | 5/2006 | Shen et al. |   |
|---|---|---|---|---|---|
| 7,181,231 | B2 | * | 2/2007 | Le Bodic et al. | 455/466 |
| 7,333,804 | B2 | * | 2/2008 | Kim | 455/414.4 |
| 7,548,755 | B2 | * | 6/2009 | Kim | 455/466 |
| 2002/0156856 | A1 |   | 10/2002 | Takahashi |   |
| 2002/0177454 | A1 |   | 11/2002 | Karri et al. |   |
| 2003/0058815 | A1 |   | 3/2003 | Shen et al. |   |
| 2003/0078033 | A1 | * | 4/2003 | Sauer et al. | 455/412 |
| 2004/0185883 | A1 | * | 9/2004 | Rukman | 455/466 |
| 2004/0266411 | A1 | * | 12/2004 | Galicia et al. | 455/414.4 |
| 2005/0018670 | A1 | * | 1/2005 | Shigematsu et al. | 370/389 |
| 2005/0021776 | A1 | * | 1/2005 | Skwarek et al. | 709/228 |

(Continued)

FOREIGN PATENT DOCUMENTS

EP   1261180   11/2002

(Continued)

OTHER PUBLICATIONS

English Language Abstract of KR 10-2006-0006575 which corresponds to Korean Patent Registration No. 10-0580737.

(Continued)

Primary Examiner—Aung S Moe
Assistant Examiner—Vinncelas Louis
(74) Attorney, Agent, or Firm—KED & Associates, LLP

(57) ABSTRACT

A method for enhancing a message service of a mobile communication terminal is described. When combining messages, a method for transmitting a message using a mobile communication terminal includes selecting messages stored in a mobile communication terminal; combining the selected messages into at least one message using a predetermined specifier; and sending the combined message to a destination device. In addition, when separating a message, a method for receiving a message from a mobile communication terminal includes selecting a message from a first message box of a destination device; separating the selected message into a plurality of messages; and associating the separated messages with a second message box of the destination device.

28 Claims, 3 Drawing Sheets

U.S. PATENT DOCUMENTS

| | | | |
|---|---|---|---|
| 2005/0108363 A1 | 5/2005 | Torigoe et al. | |
| 2005/0118986 A1* | 6/2005 | Barton et al. | 455/412.1 |
| 2005/0164721 A1* | 7/2005 | Eric Yeh et al. | 455/466 |
| 2005/0190269 A1* | 9/2005 | Grignani | 348/211.2 |
| 2005/0250520 A1* | 11/2005 | Johnson et al. | 455/466 |
| 2005/0261010 A1* | 11/2005 | Anglero | 455/466 |
| 2006/0031342 A1* | 2/2006 | Cunningham et al. | 709/206 |
| 2006/0112169 A1* | 5/2006 | Bodlaender et al. | 709/217 |
| 2006/0128407 A1* | 6/2006 | Kim | 455/466 |

FOREIGN PATENT DOCUMENTS

| | | |
|---|---|---|
| JP | 4-351040 | 12/1992 |
| JP | 8-251146 | 9/1996 |
| JP | 10-4432 | 1/1998 |
| JP | 2000-207307 | 7/2000 |
| JP | 2002-318771 | 10/2002 |
| JP | 2003-179978 | 6/2003 |
| JP | 2004-178072 | 6/2004 |
| JP | 2004-289814 | 10/2004 |
| KR | 10 0580737 | 1/2006 |
| WO | 01/72063 | 9/2001 |
| WO | 03/024069 | 3/2003 |
| WO | 03/098894 | 11/2003 |

OTHER PUBLICATIONS

English language Abstract of JP 2000-207307.
English language Abstract of JP 4-351040.
English language Abstract of JP 10-4432.
English language Abstract of JP 2003-179978.
English language Abstract of JP 8-251146.
English language Abstract of JP 2004-178072.
English language Abstract of JP 2004-289814.
English language Abstract of JP 2002-318771.

* cited by examiner

METHOD FOR TRANSMITTING AND RECEIVING A MESSAGE USING A MOBILE COMMUNICATION TERMINAL

This application claims the benefit of the Korean Application No. 10-2004-0111451 filed on Dec. 23, 2004, which is hereby incorporated by reference in its entirety.

BACKGROUND OF THE INVENTION

1. Field of the Invention

The present invention relates to a mobile communication terminal, and a method for transmitting and receiving a message using a mobile communication terminal, which can improve the convenience of users using a message service and back up messages stored in a message box without a separate device.

2. Description of the Related Art

In general, a mobile communication terminal is a device which provides a user with communication capability at any location which is within a radio service area. If a mobile communication terminal is within a coverage area of a Base Station (BS), a user of the mobile communication terminal may communicate with another person via a wireless connection to the BS, and a wireline connection, controlled in part by a Mobile Switching Center (MSC). A mobile communication terminal may be capable of communicating both voice signals and data signals (such as multimedia or image data).

Short Message Service (SMS), which is a common supplementary service provided in mobile communication terminals, permits simple and precise transmission of a message to another party by using symbols, numbers, characters and figures. Since a SMS transmission occupies a data channel for a very short period time, the cost of transmitting a SMS message is relatively low. Advantageously, a SMS message can be transmitted to another person without that person having to answer a call (i.e., go off hook).

Some related art mobile communication terminals provide a user with the ability to retransmit selected SMS messages which are stored in a user's SMS message box. For example, the user may select a SMS message, edit the SMS message, enter the telephone number of a communication terminal to send the edited message to, and then send the message. The communication terminal that receives the edited message can then store the edited message in a SMS message box.

Since mobile communication terminals are provided with a finite amount of storage capacity, some related art mobile communication terminals provide a user with the ability to transfer SMS messages stored in a SMS message box of the mobile communication terminal to a Personal Computer (PC) for storage, through a port in the mobile communication terminal, such as a Universal Serial Bus (USB) port or a Universal Asynchronous Receiver (UART) port.

If a user of a related art mobile communication terminal wishes to retransmit several SMS messages stored in a SMS message box, unfortunately, the user must select and send the messages one by one, which is a big inconvenience.

Moreover, a disadvantage of related art mobile communication terminals which allow a user to transfer SMS messages stored in a SMS message box to a PC is that they require a USB or UART port, and a USB or UART cable to connect the mobile communication terminal to the PC.

SUMMARY OF THE INVENTION

Therefore, an object of the present invention is to provide a method for transmitting and/or receiving a message using a mobile communication terminal, which can improve the convenience of users using a message service by combining a plurality of messages into one message for transmission, and separating a received message into a plurality of messages.

Another object of the present invention is to provide a method for transmitting and/or receiving a message using a mobile communication terminal, which allows messages stored in a message box to be transferred to another device for storage, without requiring connection cables, by combining a plurality of messages into one message and sending the one combined message to the other device.

To achieve these and other advantages and in accordance with the purpose of the present invention, as embodied and broadly described herein, one aspect of the present invention relates to a method for transmitting a message with a mobile communication terminal, including selecting messages stored in a mobile communication terminal; combining the selected messages into at least one message using a predetermined specifier; and sending the combined message to a destination device. The destination device may be a mobile communication terminal, a personal computer, or a server, for example.

The messages stored in the mobile communication terminal may be stored in a message box. The selected messages may be short messages associated with a Short Message Service (SMS) message box, and the combined message may have one of a Long Message Service (LMS) and a Multimedia Message Service (MMS) format. The combined message may be sent by Multimedia Message Service (MMS). Combining the selected messages may include determining whether the size of the selected message is smaller than a predetermined maximum transmission capacity, comparing the number of the selected messages with a predetermined message number when the size of the selected messages is smaller than the predetermined maximum transmission capacity, inputting one of a telephone number and an e-mail address when the number of the selected messages is greater than the predetermined message number, and combining the selected messages into one message on the basis of the inputted receiving side telephone number or e-mail address.

The method may include editing the selected messages if the size of the selected messages is larger than the predetermined maximum transmission capacity, and prompting a user of the mobile communication terminal to reselect messages if the size of the selected messages is larger than the predetermined maximum transmission capacity.

The method may also include sending the selected messages to the destination device by SMS when the number of the selected messages is smaller than the predetermined message number. The predetermined message number may be the largest number of SMS messages that can be transmitted at a cost less than or equal to a cost of transmitting one MMS message.

The method may also include determining whether the selected messages will be transmitted by SMS, inputting the telephone number of email address when it is determined that the selected messages will be transmitted by SMS, and sequentially transmitting the selected short messages by SMS based on the inputted telephone number or email address. Determining whether the selected messages will be transmitted by SMS may include prompting the user to select whether to transmit by SMS, and determining the user's selection.

Combining the selected messages into one message using a predetermined specifier may include inserting the predetermined specifier between the selected messages. The predetermined specifier may be '\c' when a telephone number is inputted, and may include at least one enter key character when an e-mail address is inputted.

To achieve these and other advantages and in accordance with the purpose of the present invention, as embodied and broadly described herein, one aspect of the present invention relates to a method for receiving a message from a mobile communication terminal, including selecting a message stored from a first message box of a destination device; separating the selected message into a plurality of messages; and associating the separated messages with a second message box of the destination device.

The selected message may have a multimedia message format, and the separated message may be short messages. The first message box may be a MMS message box, and the second message box may be a SMS message box.

The method may include determining whether the selected message includes a predetermined specifier, adding a message separation option to a menu when the selected message includes the predetermined specifier, and displaying the selected or separated message on a display unit. The method may also include displaying the selected message on the display unit when the selected message does not include the predetermined specifier. The separating may be performed in response to a user selecting the message separation option from the menu, and may be automatically performed. The selected message may be separated into a plurality of messages in response to a user's selection, and may be separated base on the predetermined specifier. The predetermined specifier designates the plurality of messages within the selected message.

The method may also include displaying one of an icon and a letter indicating whether the message from the first message box includes the predetermined specifier. The method may also include storing the separated messages in the second message box of the destination device, and displaying a list of the separated messages. The method may include transmitting messages selected from the displayed list by the user to a predetermined e-mail address, storing message selected from the displayed list by the user in the second message box of the destination device, or re-transmitting messages selected from the displayed list by the user to another mobile communication terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of a method for transmitting and receiving a message using a mobile communication terminal will be described with reference to the accompanying drawings, divided into a method for combining a plurality of SMS messages into one multimedia message and a method for separating one multimedia message into a plurality of SMS messages.

Another messaging service, called Multimedia Messaging Service (MMS), is an evolution of Short Message Service (SMS). MMS is a messaging service which permits the transmission and reception of a variety of multimedia data such as video, music, graphics and photos in addition to previously available text message service.

Figure 1:
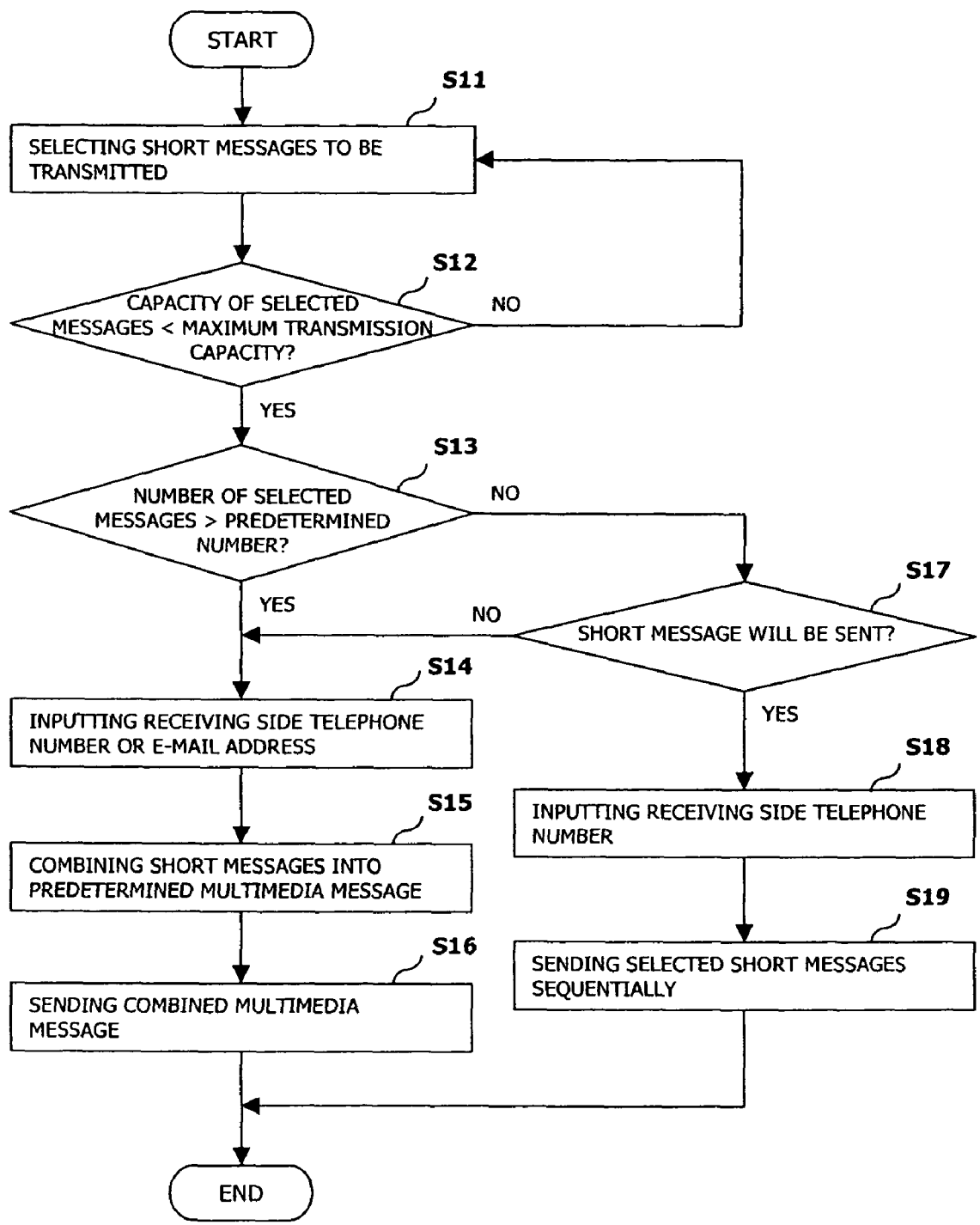
FIG. 1 is a flowchart showing a method for transmitting a message using a mobile communication terminal in accordance with the present invention.

FIG. 1 is a flowchart showing a method for transmitting a message using a mobile communication terminal in accordance with the present invention.

As shown in FIG. 1, a method for transmitting a message using a mobile communication terminal in accordance with the present invention includes selecting SMS messages stored in a SMS message box of a mobile communication terminal (S11); determining whether the size of the selected SMS messages is less than a predetermined maximum transmission capacity (S12); and determining whether the number of the selected SMS messages is greater than a predetermined number when the size of the selected SMS messages is less than the predetermined maximum transmission capacity (S13). If the number of selected SMS messages is greater than the predetermined number, inputting a telephone number or e-mail address to send the selected SMS messages to (S14); combining the selected SMS messages into a MMS message (S15); and sending the combined MMS message to another device (S16). The method also includes determining whether the selected SMS messages will be transmitted by Short Message Service (SMS) when the number of the selected SMS messages is less than the predetermined number (S17); entering a telephone number or email address to send the selected SMS messages to when it is determined that the selected SMS messages will be transmitted by SMS (S18); and sequentially transmitting the selected SMS messages by SMS (S19).

A method for transmitting a message using a mobile communication terminal in accordance with the present invention is described in detail below.

First, a user selects SMS messages, from a SMS message box of a mobile communication terminal, which he wishes to transfer to another device (S11). The other device may be, for example, another mobile communication terminal, a PC, a server, or any other device capable of storing SMS messages.

The mobile communication terminal then determines the combined size of all of the selected SMS messages, and compares this sum with a predetermined maximum transmission capacity (S12). More specifically, since the selected SMS messages will be combined into one MMS message, the combined message size should not exceed the maximum transmission capacity of one MMS message.

For example, the standard capacity of an SMS message is 80 bytes, whereas the standard capacity of a MMS message is 5120 bytes. Thus, to combine a plurality of SMS messages into one MMS message, the combined size of the SMS message must not exceed the maximum transmission capacity of one MMS message, which is 5120 bytes.

If the combined size of the SMS messages selected by the user exceeds the maximum transmission capacity of a MMS message, the mobile communication terminal instructs the user to deselect some of the selected SMS messages, until the combined size of the SMS messages is within the maximum transmission capacity. Once the mobile communication terminal determines that the combined size of the selected SMS messages is within the maximum transmission capacity, the mobile communication terminal then compares the number of the selected SMS messages with a predetermined number (S13).

If the number of selected SMS messages is greater than the predetermined number, the mobile communication terminal instructs the user to enter a destination telephone number or e-mail address to send the selected SMS messages to (S14).

After the user enters a destination telephone number or email address, the mobile communication terminal combines the selected SMS messages into a single MMS message (S15). To separate the SMS messages within the MMS message, the mobile communication terminal inserts a predetermined specifier, between each SMS message, based upon whether the destination is a telephone number or an email address. For example, if the user specifies that the selected SMS messages will be sent to a telephone number, the mobile communication terminal may insert '\c', or some other character, between each SMS message. However, if the user specifies that the selected SMS messages will be sent to an email address, the mobile communication may insert an enter character, or some other character, between each SMS message. It should be apparent that the present invention is not limited to any particular specifier. The primary purpose of the specifiers is to aid the destination device in recognizing how to separate the SMS messages from the MMS message when the MMS message is received.

Finally, the mobile communication terminal sends the MMS message which includes the selected SMS messages to the destination device, using MMS (S16).

Returning to step (S13), if the mobile communication terminal determines that the number of the selected SMS messages is less than the predetermined number, the mobile communication terminal asks the user whether he wishes to send the selected SMS messages by SMS (S17). That is, when transmitting the selected SMS messages by SMS is cheaper than combining the SMS messages into one MMS message and transmitting it by MMS, the mobile communication terminal offers the user the option of either transmitting by SMS or MMS.

For example, if it costs 10 cents to transmit one SMS message and 25 cents to transmit one MMS message, the cost of transmitting three SMS messages is 30 cents. Therefore, in this example, the cost of transmitting one MMS message is less than the cost of transmitting three or more SMS messages. However, in this example, if a user wishes to transmit less than three SMS messages, it would be cheaper for him to transmit via SMS.

Thus, if the number of selected message is less than the predetermined number (three in the above example), the user is asked whether he would like to transmit via SMS. If he decides to transmit via MMS, the method proceeds to step (S14) as illustrated in FIG. 1. However, if the user indicates that he wishes to transmit via SMS, he is instructed to enter a destination phone number or email address (S18).

Finally, the mobile communication terminal sequentially transmits the selected SMS messages to the destination device using SMS (S19).

Hereinafter, a method for separating a received MMS message containing a plurality of SMS messages will be described with reference to FIG. 2.

Figure 2:
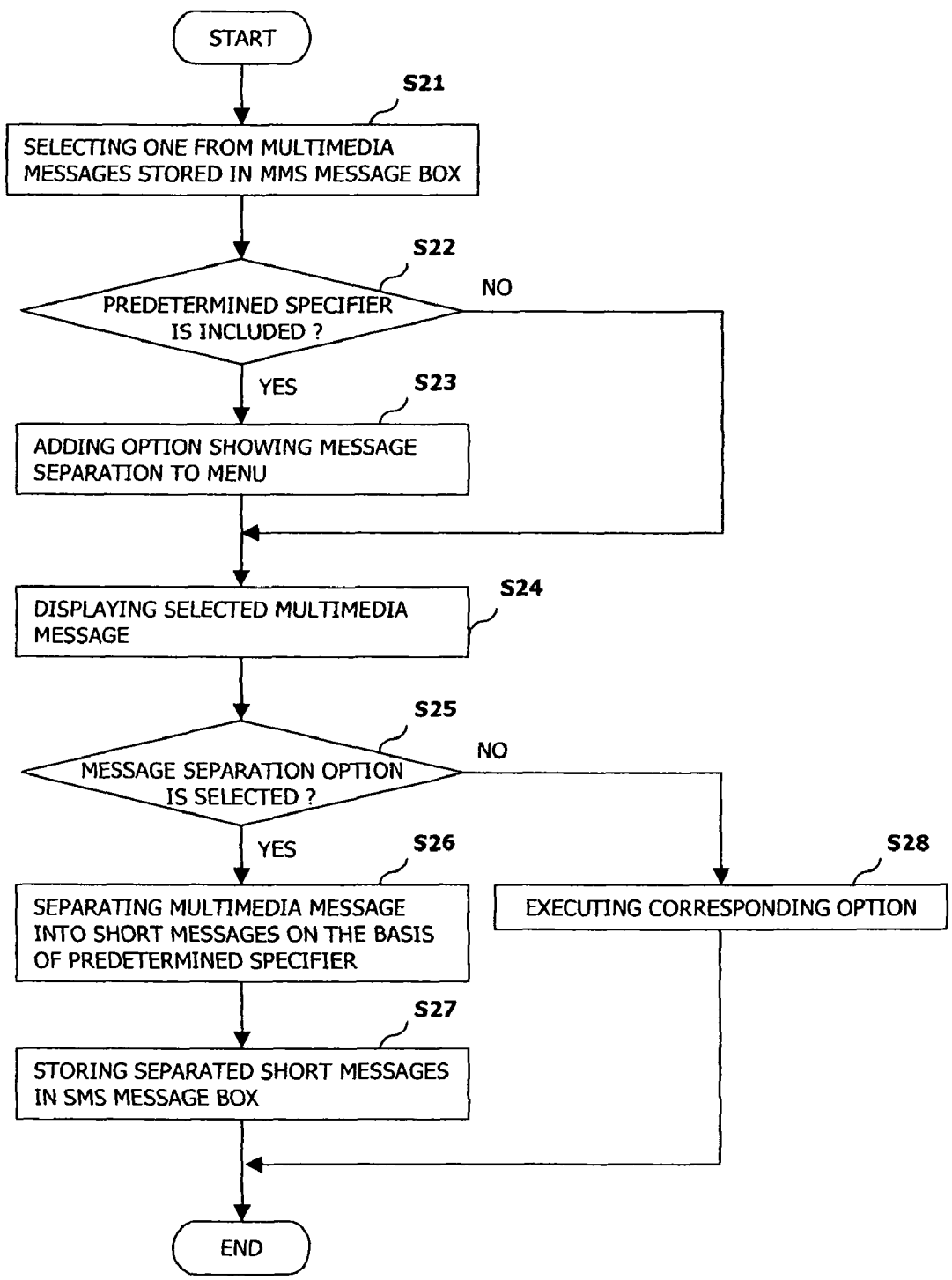
FIG. 2 is a flowchart showing a method for receiving a message using a mobile communication terminal in accordance with the present invention.

FIG. 2 is a flowchart showing a method for receiving a message using a destination device in accordance with the present invention.

As shown in FIG. 2, a method for receiving a message using a destination device in accordance with the present invention includes selecting a MMS message stored in a MMS message box (S21); determining whether a predetermined specifier is included in the selected MMS message (S22); adding an message separation option to a menu when the predetermined specifier is included in the selected MMS message (S23); and displaying the selected MMS message (S24). Optionally, a separated SMS message may be displayed. The method further includes determining whether the message separation option is selected (S25); separating the displayed MMS message into SMS messages when the message separation option is selected (S26); and storing the separated SMS messages in a SMS message box (S27). If a user selects an option other than the message separation option, the destination device executes that option accordingly (S28).

A method for receiving a message using a destination device in accordance with the present invention is described in detail below.

First, the destination device receives a MMS message from a mobile communication terminal and stores the received MMS message in a MMS message box. As noted above, the destination device is a device capable of storing SMS messages, such as, but not limited to, a mobile communication terminal, a PC, or a server.

Here, the mobile communication terminal in accordance with the present invention can display an icon or a letter, which indicates whether the received MMS message includes a predetermined specifier, together with the message, and the principle of receiving the MMS message in such a manner will now be described with reference to FIGS. 3A and 3B.

Figure 3A:
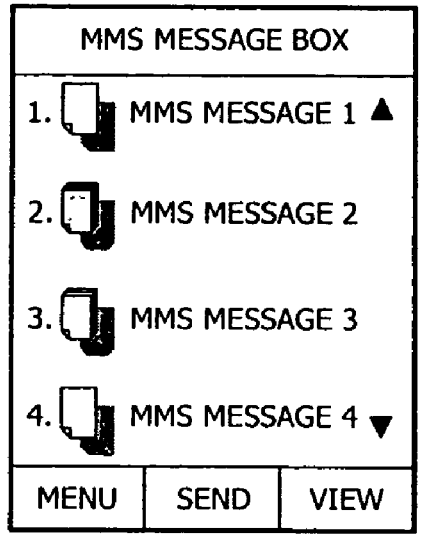
FIGS. 3A and 3B are views for describing the principle of receiving a MMS message of the mobile communication terminal in accordance with the present invention.
Figure 3B:
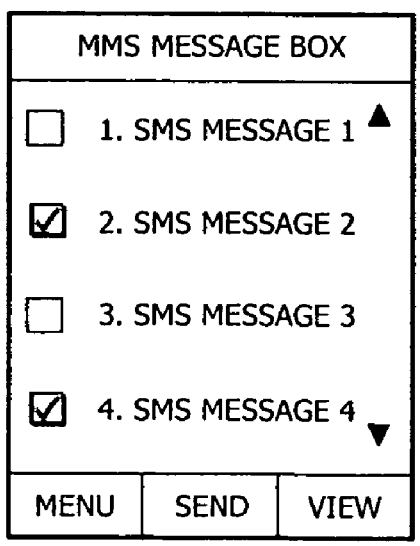

FIGS. 3A and 3B are views for describing the principle of receiving a MMS message of the mobile communication terminal in accordance with the present invention.

As illustrated in FIG. 3A, it can be seen that, after checking whether the received MMS message includes the predetermined specifier, the mobile communication terminal in accordance with the present invention can store, in a MMS message box, the MMS message, and display the MMS message together with an icon or a letter indicating whether the received MMS message is a normal MMS message or a combined MMS message according to the result of the checking. Thus, the combined MMS message can include information corresponding to the icon or the letter and the mobile communication terminal can display the MMS message together with the icon or the letter based on the information.

If a user selects a multimedia MMS message stored in the MMS message box of the destination device (S21), the destination device determines whether a predetermined specifier is included in the selected MMS message (S22).

If the MMS message includes the predetermined specifier, the destination device adds a message separation option to a menu (S23) and displays the selected MMS message (S24).

At this time, the user may select any option from the menu, for example, reply, retransmission, delete, telephone number store, message separation and the like, and the destination device processes the displayed MMS message accordingly.

Next, the destination device determines whether the user has selected the message separation option (S25). When the user selects the message separation option, the destination device uses the predetermined specifiers included in the MMS message to separate the MMS message into a plurality of SMS messages (S26). If the user selects an option other than the message separation option, the destination device executes that option accordingly (S28).

Here, when selecting the message separation option, the user may store some SMS messages among a plurality of SMS messages included in the MMS message including the predetermined specifier because of the message capacity of the SMS message box.

As shown in FIG. 3B, it can be seen that the mobile communication terminal displays a list of the plurality of SMS messages included in the MMS message including the predetermined specifier so that SMS messages selected from the displayed list by the user can be transmitted to an electronic-mail of the user to be backed up and then can be stored.

Also, it can be seen that the destination device displays a list of the plurality of SMS messages included in the MMS message including the predetermined specifier so that SMS messages selected from the displayed list by the user can be stored.

Besides, it can be seen that the destination device displays a list of the plurality of SMS messages included in the MMS message including the predetermined specifier so that only SMS messages selected among the displayed SMS messages by the user can be stored after being retransmitted to another mobile communication terminal.

Finally, the destination device stores the separated SMS messages in a SMS message box (S27).

As described above, the method of the present invention for transmitting and/or receiving a message using a mobile communication terminal, can improve the convenience of users using a message service by combining a plurality of messages into one message for transmission, and separating a received message into a plurality of messages. As described above, the method may be implemented using an MMS service. However, other messaging services may alternatively be used, such as a Long Message Service (LMS), without departing from the spirit or scope of the invention.

The present invention also allows messages stored in a message box to be transferred to another device for storage, without requiring connection cables, by combining a plurality of messages into one message and sending the one combined message to the other device.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting a message with a mobile communication terminal, comprising:
   selecting, by a user, a plurality of Short Message Service (SMS) messages to be combined into a Multimedia Message Service (MMS) format, the plurality of SMS messages being displayed on a display unit;
   combining, at the mobile communication terminal, the plurality of selected SMS messages into at least one MMS message by separating two of the selected SMS messages with a predetermined specifier; and
   sending the combined message from the mobile communication terminal to a destination device, wherein combining the plurality of selected SMS messages includes:
   determining whether a total size of the plurality of selected SMS messages is smaller than a predetermined maximum transmission capacity,
   comparing a number of the selected plurality of SMS messages with a predetermined message number when the determined total size of the selected plurality of SMS messages is smaller than the predetermined maximum transmission capacity,
   inputting one of a telephone number and an e-mail address when the number of the selected plurality of SMS messages is greater than the predetermined message number, and
   combining the selected plurality of SMS messages into the at least one MMS message based on the inputted telephone number or the inputted e-mail address.

2. The method according to claim 1, wherein the combined message has the Multimedia Message Service (MMS) format.

3. The method according to claim 1, further comprising editing the selected plurality of SMS messages when the determined total size of the selected plurality of SMS messages is larger than the predetermined maximum transmission capacity.

4. The method according to claim 3, further comprising prompting the user of the mobile communication terminal to reselect SMS messages when the size of the selected plurality of SMS messages is larger than the predetermined maximum transmission capacity.

5. The method according to claim 1, further comprising sending the selected plurality of SMS messages from the mobile communication terminal to the destination device by Short Message Service (SMS) when the number of the selected plurality of SMS messages is smaller than the predetermined message number.

6. The method according to claim 5, wherein the predetermined message number is a largest number of SMS messages that can be transmitted at a cost less than or equal to a cost of transmitting one Multimedia Messaging Service (MMS) message.

7. The method according to claim 5, further comprising:
   determining whether the selected plurality of SMS messages will be transmitted by SMS;
   inputting the telephone number or the email address when it is determined that the selected plurality of SMS messages will be transmitted by SMS; and
   sequentially transmitting the selected short messages by SMS based on the inputted telephone number or the inputted email address.

8. The method according to claim 7, wherein determining whether the selected plurality of SMS messages will be transmitted by SMS comprises:
   prompting the user to select whether to transmit by SMS; and
   determining the user's selection.

9. The method according to claim 1, wherein combining the selected plurality of SMS messages into the at least one MMS message comprises inserting the predetermined specifier between the two of the selected SMS messages.

10. The method according to claim 9, wherein the predetermined specifier comprises '\c' when the telephone number is inputted.

11. The method according to claim 9, wherein the predetermined specifier comprises at least one enter key character when the e-mail address is inputted.

12. The method according to claim 1, wherein the plurality of SMS messages stored in the mobile communication terminal are stored in a message box.

13. The method according to claim 1, wherein the combined message is sent by Multimedia Message Service (MMS).

14. The method according to claim 1, wherein the destination device is one of a mobile communication terminal, a personal computer, and a server.

15. A method for transmitting a message with a mobile communication terminal, comprising:
   selecting, by a user, a plurality of Short Message Service (SMS) messages displayed on a display unit to be combined together as a Multimedia Message Service (MMS) message;
   determining whether a total size of all the selected SMS messages is less than a predetermined size;
   determining whether a total number of the selected SMS messages is greater than a predetermined message number when the determined total size of the selected SMS messages is less than the predetermined size;
   when the determined number of total number of selected SMS messages is greater than the predetermined message number, combining the selected plurality of SMS messages into one MMS message by separating messages using at least one predetermined specifier; and
   transmitting the combined message from the mobile communication terminal to a destination device.

16. The method according to claim 15, wherein the selected plurality of SMS messages are short messages associated with a SMS message box.

17. The method according to claim 15, further comprising editing the selected plurality of SMS messages when the determined total size of the selected SMS messages is larger than the predetermined size.

18. The method according to claim 15, further comprising reselecting SMS messages displayed on the display unit when the determined total size of the selected SMS messages is larger than the predetermined size.

19. The method according to claim 15, further comprising:
   inputting one of a telephone number and an e-mail address when the determined total number of the selected plurality of SMS messages is greater than the predetermined message number; and
   combining the selected plurality of SMS messages into one message based on the inputted telephone number or the inputted e-mail address.

20. The method according to claim 19, further comprising sending the selected plurality of SMS messages to the destination device by Short Message Service (SMS) when the determined total number of the selected SMS messages is smaller than the predetermined message number.

21. The method according to claim 20, wherein the predetermined message number is a largest number of SMS messages that can be transmitted at a cost less than or equal to a cost of transmitting one Multimedia Messaging Service (MMS) message.

22. The method according to claim 20, further comprising:
   determining whether the selected plurality of SMS messages will be transmitted by SMS;
   inputting the telephone number or the email address when it is determined that the selected plurality of SMS messages will be transmitted by SMS; and
   sequentially transmitting the selected short messages by SMS based on the inputted telephone number or the inputted email address.

23. The method according to claim 22, wherein determining whether the selected SMS messages will be transmitted by SMS comprises providing an option for the user to select whether to transmit by SMS.

24. A method for transmitting a message with a mobile communication terminal, comprising:
   selecting a plurality of short message service (SMS) messages to be combined into one Multimedia Message Service (MMS) message, the plurality of SMS messages being displayed on a display unit;
   determining whether a size of all the selected SMS messages is less than a predetermined value;
   determining whether a total number of the selected SMS messages is greater than a predetermined message number when the determined size of the selected SMS messages is less than the predetermined value;
   when the determined total number of selected SMS messages is greater than the predetermined message number, combining, at the mobile communication terminal, the selected SMS messages into the one MMS message by separating messages using at least one predetermined specifier; and
   transmitting the combined MMS message from the mobile communication terminal to a destination device.

25. The method according to claim 24, further comprising editing the selected SMS messages when the determined size of the selected SMS messages is larger than the predetermined value.

26. The method according to claim 24, further comprising reselecting SMS messages displayed on the display unit when the determined size of the selected SMS messages is larger than the predetermined value.

27. The method according to claim 24, further comprising:
   inputting one of a telephone number and an e-mail address when the determined total number of the selected SMS messages is greater than the predetermined message number; and
   combining the selected SMS messages into one MMS message based on the inputted telephone number or the inputted e-mail address.

28. The method according to claim 27, further comprising sending the selected SMS messages to the destination device by Short Message Service (SMS) when the determined total number of the selected SMS messages is smaller than the predetermined message number.

* * * * *